Nov. 22, 1927.  
F. G. WILLIAMSON  
STOP SCREW DEVICE  
Filed Feb. 15, 1927  
1,650,313
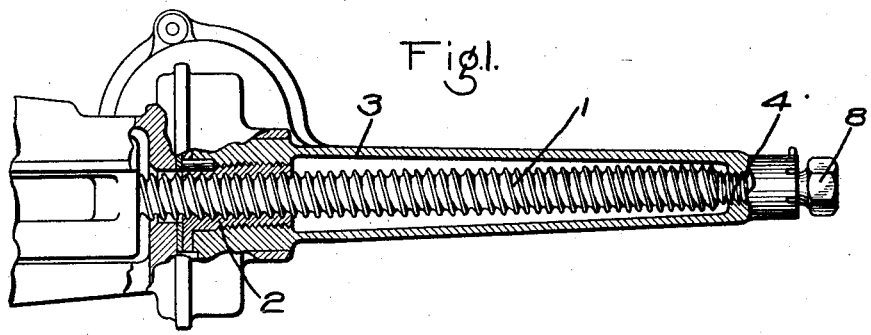
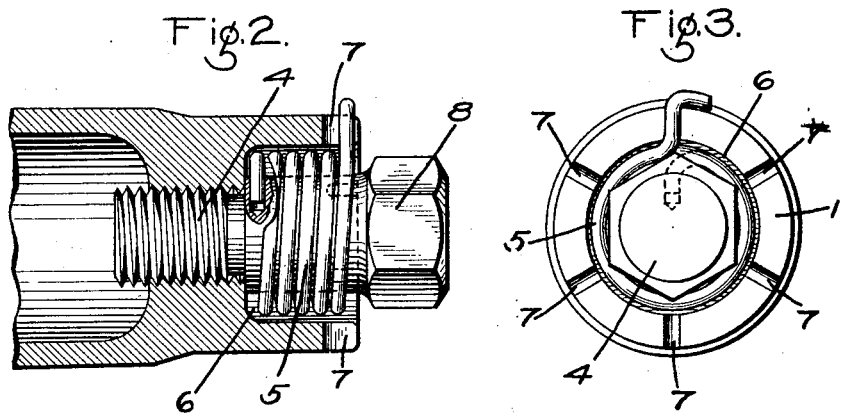
INVENTOR  
FREDERICK G. WILLIAMSON  
BY *Wm. M. Cady*  
ATTORNEY Patented Nov. 22, 1927.

1,650,313

UNITED STATES PATENT OFFICE.

FREDERICK G. WILLIAMSON, OF FERGUSON, MISSOURI, ASSIGNOR TO THE AMERICAN BRAKE COMPANY, OF ST. LOUIS, MISSOURI, A CORPORATION OF MISSOURI.

STOP-SCREW DEVICE.

Application filed February 15, 1927. Serial No. 168,319.

This invention relates to slack adjusters, and more particularly to a slack adjuster of the ratchet and screw type.

In the operation of the screw type of adjuster, a ratchet nut is rotated by spring pressure against a piston to which a pawl is attached.

The rotation of the ratchet nut moves a screw and crosshead longitudinally, thus changing the location of the fulcrum point of the brake lever. In normal release position of the parts, the pawl is not in engagement with the ratchet teeth, and the ratchet nut can be freely rotated by hand. However, should the permissible travel of the screw and crosshead of the adjuster have become exhausted, the final stroke of the piston and pawl will not be completed, as the end of the screw will then contact with a stop screw located in the end of the ratchet nut, thus preventing further rotation.

After this occurs, the ratchet nut is locked against movement in either direction until the stop screw is loosened up, thus allowing sufficient additional take-up movement to permit the piston and pawl to complete their stroke and release the ratchet nut.

It is evident that if the stop screw is not re-tightened after readjustment of the adjuster has been completed, it will not be in position to perform its function when the adjuster again reaches the limit of its travel.

The principal object of my invention is to provide means for automatically re-tightening the stop screw after the ratchet nut has been rotated in resetting the adjuster.

In the accompanying drawing; Fig. 1 is a sectional view of the screw portion of a slack adjuster, showing my improvement applied thereto; Fig. 2 an enlarged sectional view of the extreme end portion of the slack adjuster; and Fig. 3 an end view thereof.

In Fig. 1, only the screw portion of a slack adjuster is shown, as it is not deemed necessary to a complete disclosure of the invention, to show the complete slack adjuster.

The slack adjuster screw 1 works in a nut 2 adapted to be rotated by a ratchet wheel and a pawl, the pawl being operated by a piston (not shown). A ratchet nut member 3 rotates with the nut 2 and encloses the screw 1.

Having screw-threaded engagement in the end of the ratchet nut member 3 and adapted to be engaged by the end of the screw 1, is a stop screw 4.

When the adjuster screw 1 has traveled to the extreme end of its stroke, as shown in Fig. 1, it engages the end of the stop screw 4, and in order to effect the readjustment of the slack adjuster parts, the operator backs off the stop screw 4, so as to permit sufficient further movement of the slack adjuster screw to enable the pawl and piston to move and allow the return movement of the screw 1.

In some instances, the stop screw has either been lost or has been jarred loose to such an extent that the screw no longer serves as a stop. In such case, it is necessary to take the slack adjuster apart, in order to release the pawl.

In order to overcome this difficulty, I have associated with the stop screw, a coil spring 5 which is adapted to be mounted in a pocket 6 provided in the end of the ratchet nut 3. The spring surrounds a non-threaded portion of the stop screw and has one end secured to the screw and the other end bent so as to lie in one of several radial grooves 7 cut in the end of the ratchet nut member. It will now be seen that rotative movement of the stop screw 4 is resisted by the torsion of the spring 5.

If the stop screw 4 is rotated by applying a wrench to the head 8 of the screw, in order to permit movement of the slack adjuster screw 1, it will be evident that when the head 8 is free of the wrench, the torsion of the spring 5 will operate to rotate the stop screw back to its normal position, as shown in Fig. 2, so that the screw cannot be left partly unscrewed.

The spring also prevents loss of the stop screw and prevents the screw from jarring loose.

Having now described my invention, what I claim as new and desire to secure by Letters Patent, is:

1. The combination with a brake slack adjuster provided with a slack adjuster screw, of a stop screw adapted to be engaged by said slack adjuster screw and means acting on said stop screw and tending to maintain said screw in position for engagement by the slack adjuster screw.

2. The combination with a brake slack adjuster provided with a slack adjuster screw, of a stop screw having a normal position in which said screw is engageable by said slack adjuster screw and means acting on said stop screw and tending to rotate said screw from other positions to said normal position.

3. The combination with a brake slack adjuster provided with a slack adjuster screw, of a stop screw having a stop position in which said screw acts as a stop for said slack adjuster screw and a spring acting on said stop screw and tending to rotate same to said stop position.

In testimony whereof I have hereunto set my hand.

FREDERICK G. WILLIAMSON.